United States Patent [19]

Gotoh et al.

[11] E Patent Number: Re. 32,977

[45] Reissued Date of Patent: Jul. 4, 1989

[54] KEY-HOLDING STRUCTURE OF KEYBOARD WITH CURVED OPERATING SURFACE OF KEYS

[75] Inventors: Hideo Gotoh; Satoshi Fukao; Makoto Suzuki, all of Aichi, Japan

[73] Assignee: Brother Kogyo Kabushiki Kaisha, Aichi, Japan

[21] Appl. No.: 72,108

[22] Filed: Jul. 9, 1987

Related U.S. Patent Documents

Reissue of:

[64] Patent No.: 4,528,428
Issued: Jul. 9, 1985
Appl. No.: 598,920
Filed: Apr. 10, 1984

[30] Foreign Application Priority Data

Apr. 20, 1983 [JP] Japan ..... 58-59365[U]

[51] Int. Cl.[4] ..... H01H 9/00; H01H 13/70

[52] U.S. Cl. ..... 200/5 A; 200/600; 200/517; 361/288; 361/398; 400/479.1; 400/488

[58] Field of Search ..... 200/5 R, 5 A, DIG. 1, 200/159 B, 302.2, 314, 340; 235/145 R; 361/398, 288; 400/479, 479.1, 479.2, 485, 488, 489

[56] References Cited

U.S. PATENT DOCUMENTS

| | | | |
|---|---|---|---|
| Re. 30,435 | 11/1980 | Fukao | 200/159 R |
| Re. 31,332 | 8/1983 | Larson | 200/5 A |
| 3,120,583 | 2/1964 | Cornell, III | 200/5 R |
| 3,308,253 | 3/1967 | Krakinowski | 200/46 |
| 3,311,210 | 3/1967 | Peroni | 400/479 |
| 3,382,338 | 5/1968 | Arseneault et al. | 200/159 B |
| 3,681,723 | 8/1972 | Goll | 335/207 |
| 3,760,137 | 9/1973 | Shimojo et al. | 200/263 |
| 3,808,384 | 4/1974 | Boulanger | 200/5 A |
| 3,898,421 | 8/1975 | Suzumura | 200/159 B |
| 3,911,234 | 10/1975 | Kotaka | 200/5 A |
| 3,952,174 | 4/1976 | Boulanger et al. | 200/5 A |
| 3,959,611 | 5/1976 | Greene et al. | 200/5 A |
| 4,046,975 | 9/1977 | Seeger, Jr. | 200/159 B |
| 4,072,840 | 2/1978 | Daigle | 200/296 |
| 4,086,451 | 4/1978 | Boulanger | 200/5 A |
| 4,123,627 | 10/1978 | Boulanger et al. | 200/5 A |
| 4,271,333 | 6/1981 | Adams et al. | 379/368 |
| 4,294,555 | 10/1981 | Galaske et al. | 400/488 |
| 4,320,268 | 3/1982 | Brown | 200/5 A |
| 4,331,852 | 5/1982 | Baran et al. | 200/306 |
| 4,363,942 | 12/1982 | Deeg et al. | 200/5 A |
| 4,423,464 | 12/1983 | Tamura et al. | 361/288 |
| 4,440,515 | 4/1984 | Nassimbene | 400/479 |
| 4,467,150 | 8/1984 | Leitermann et al. | 200/5 A |
| 4,485,279 | 11/1984 | Nakamura | 200/5 A |
| 4,560,844 | 12/1985 | Takamura et al. | 200/5 A |
| 4,560,845 | 12/1985 | Takamura et al. | 200/5 A |
| 4,605,828 | 8/1986 | Gostomski, Jr. et al. | 200/5 A |
| 4,735,520 | 4/1988 | Suzuki et al. | 400/488 |

OTHER PUBLICATIONS

Akers, A. L., et al., IBM Technical Disclosure Bulletin, *Electronic Keyboard,* vol. 25, No. 11B, Apr., 1985, pp. 6219–6220.

*Primary Examiner*—J. R. Scott
*Attorney, Agent, or Firm*—Oliff & Berridge

[57] ABSTRACT

A keyboard assembly having key-switches, comprising a key holder plate supporting multiple keys in plural rows and movably across the thickness of the plate, and further comprising an upper casing which has a rectangular aperture closed by the key holder plate. The key holder plate has holes through which the keys extend, and integral guide portions concentric with the holes and [extend] *extending* toward the rectangular aperture. Opposite right and left sides of the aperture perpendicular to the rows of the keys are defined by side walls of the upper casing each of which has a downward extension toward the key holder plate. The extension has a convex lower end profile with which the key holder plate is held in pressed contact by fasteners, with elastic deformation thereof following the convex lower end profile of the downward extension, such that a surface generally defined by top faces of the keys is curved in cross section across the rows of the keys.

27 Claims, 3 Drawing Sheets

FIG. 1 PRIOR ART
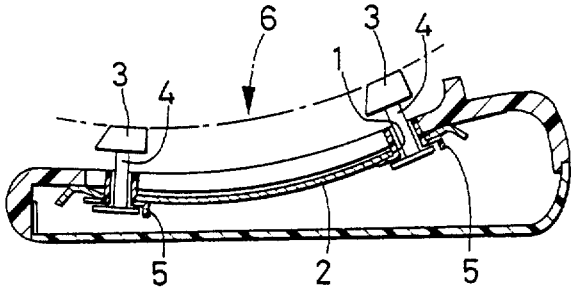
FIG. 2 PRIOR ART
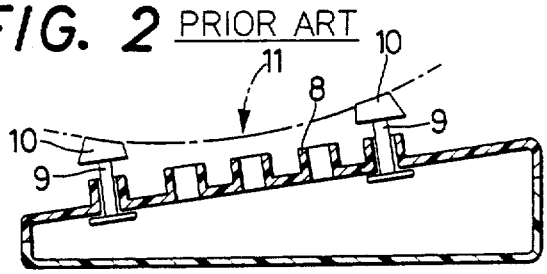
FIG. 3
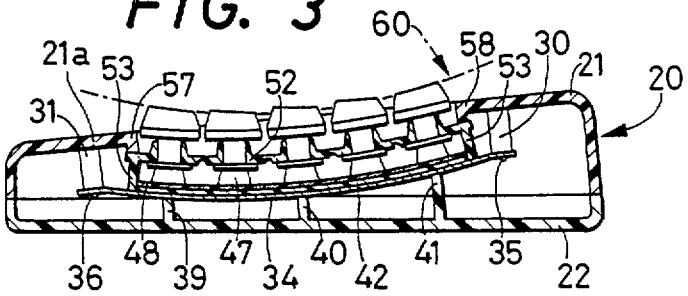
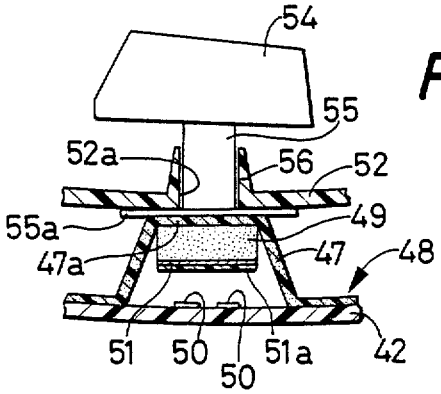
FIG. 5

KEY-HOLDING STRUCTURE OF KEYBOARD WITH CURVED OPERATING SURFACE OF KEYS

Matter enclosed in heavy brackets [ ] appears in the original patent but forms no part of this reissue specification; matter printed in italics indicates the additions made by reissue.

BACKGROUND OF THE INVENTION

The present invention relates to a keyboard assembly for providing electrical outputs corresponding to multiple keys, to signal utilization electronic devices such as typewriters and other data processing equipment.

In such a keyboard for electronic devices, a multiplicity of keys are disposed in plural rows to provide electric signals corresponding to the keys which have been depressed on their top faces. To improve ease of operation of the keys, attempts based on human engineering or ergonomics have been made to arrange the keys such that an operating surface generally defined by the top faces of the individual keys is curved to a downwardly convex shape in cross section across the rows of the keys. There have been proposed the following two methods to obtain such a curved operating surface of the keyboard:

The first method uses a curved key holder plate 2 having multiple guide holes 1, as shown in FIG. 1. The holder plate 2 is made from a steel plate by shaping it to a suitable curvature in the transverse cross section. In the guide holes 1, keystem guides 5 are fixedly inserted to slidably guide respective keystems 4 which carry at their upper ends keytops 3 having the finger-pressed top faces. In this case, the keys 3, 4 are all equally sized so that an operating surface 6 defined by the top faces is curved substantially to the curvature of the key holder plate 2.

In this method, however, it is required to fix the individual keystem guides 5 in the guide holes 1 formed in the shaped key holder plate 2. This assembling procedure is cumbersome and time-consuming, and reduces the efficiency of manufacture of the keyboard to an appreciable extent, and accordingly pushes up the cost of manufacture.

While the above method is advantageous in that the key holder plate 2, which is shaped under plastic working from a metal sheet, is capable of maintaining an initially given curved profile virtually permanently, the metal plate is required to be relatively thick for permanency of the original shape, and this inherently increases a total weight of the keyboard assembly, which may be considered as an undesired factor in the recent trend in the art toward providing compact and lightweight equipment.

The second method is illustrated in FIG. 2, wherein an upper casing 7 of a keyboard is provided with integrally formed keystem guides 8 which slidably support respective keystems 9 having keytops 10 fixed to their upper ends. In this method, an operating surface 11 of the keyboard is established by forming the keytops 10 in different sizes and shapes, depending upon the positions in which they are disposed. For example, the keytops 10 carried on the keystems 9 disposed in one of plural rows are formed with a top face having a curvature which is different from that of the keytops 10 carried on the keystems 9 in another of the plural rows.

Thus, the above second known method requires different kinds of keytops or keytops and keystems to provide different contours of top faces of the keys so that the top faces cooperate to form the curved operating surface 11. This means a need of using different kinds of molds for forming the different keys, and consequently an increased cost of manufacture of the keyboard assembly.

SUMMARY OF THE INVENTION

It is accordingly an object of the present invention to provide an improved keyboard simple in construction, easy to operate and economical to manufacture, which has a key holder plate for supporting keys with their top faces forming a curved operating surface.

According to the invention, there is provided a keyboard having multiple key-switches each comprising a key having a finger-pressed top face, a movable electrode and at least two stationary electrodes. The keyboard comprises: an upper casing including a portion which has a rectangular aperture formed through a thickness of said portion; a key holder plate supporting the multiple keys in plural rows perpendicular to the right and left sides of the rectangular aperture and movably in a direction perpendicular to a plane of the key holder plate; a printed circuit board disposed below the key holder plate and having a pattern of the stationary electrodes such that the key-switches are operated upon movement of the respective multiple keys; and a lower casing disposed below the printed circuit board and cooperating with the upper casing to enclose the key holder plate and the printed circuit board. The key holder plate has holes through which the respective keys extend in said direction, and integral guide portions formed concentrically with the holes and extending in said direction towards said rectangular aperture. The upper casing includes a pair of side walls defining opposite right and left sides of the rectangular aperture. Each of the side walls has a downward extension from a lower surface of said portion. The downward extension has a convex profile at its lower end. The keyboard further comprises retaining means for holding the key holder plate curved in cross section across the plural rows of the keys, with elastic deformation thereof in pressed contact with the convex profile of the downward extension of the side walls, such that a surface generally defined by the top faces of the multiple keys is curved to the convex end profile of the downward extension in the cross section taken along a line perpendicular to the plural rows of the multiple keys.

In the above construction, the downward extensions formed at the right and left edges of the rectangular aperture in the upper casing, permit easy shaping of the key holder plate to support the keys [to] *so* that their top faces define an operating surface with a desired downwardly-convex curvature. This curvature is determined by the lower [and] *end* profile of the downward extensions of the upper casing, without forming the keys in different sizes and shapes depending upon their positions on the key holder plate. Further, the provision of the guide portions integrally with the key holder plate to guide the keys eliminates cost and labor which are otherwise required to insert and fix keystem guides in association with guide holes as previously discussed in connection with the prior art keyboards. Further, the fabrication of a planar key holder plate with integral guide portions according to the invention is very much easier than the fabrication of a curved key holder plate with integral guide portions by plastic working on a metal sheet or by molding of a synthetic resin material. In the former method of plastic working, it is difficult to shape the metal sheet to a desired curvature because of the presence of the guide portions which are formed before the sheet is curved. The latter method of synthetic resin molding has a problem of mold release because the guide portions are formed radially. Further, the key holder plate of the keyboard of the invention is comparatively light in weight because it is not made from a relatively thick metal sheet as used in the art. Thus, the keyboard constructed according to the present invention is simple in construction, easy and economical to manufacture, as well as easy to operate.

BRIEF DESCRIPTION OF THE DRAWING

The above and other objects, features and advantages of the present invention will be better understood from reading the following description of the preferred embodiment taken in connection with the accompanying drawing in which:

FIGS. 1 and 2 are elevational views in cross section of known keyboards with keytops defining a curved operating surface;

FIG. 3 is an elevational view in cross section of one embodiment of a keyboard of the invention;

FIG. 5 is a cross sectional view in enlargement, showing one of *the* capacitive switches incorporated in the keyboard of FIGS. 3 and 4;

DETAILED DESCRIPTION OF THE PREFERRED EMBODIMENT

Figure 4:
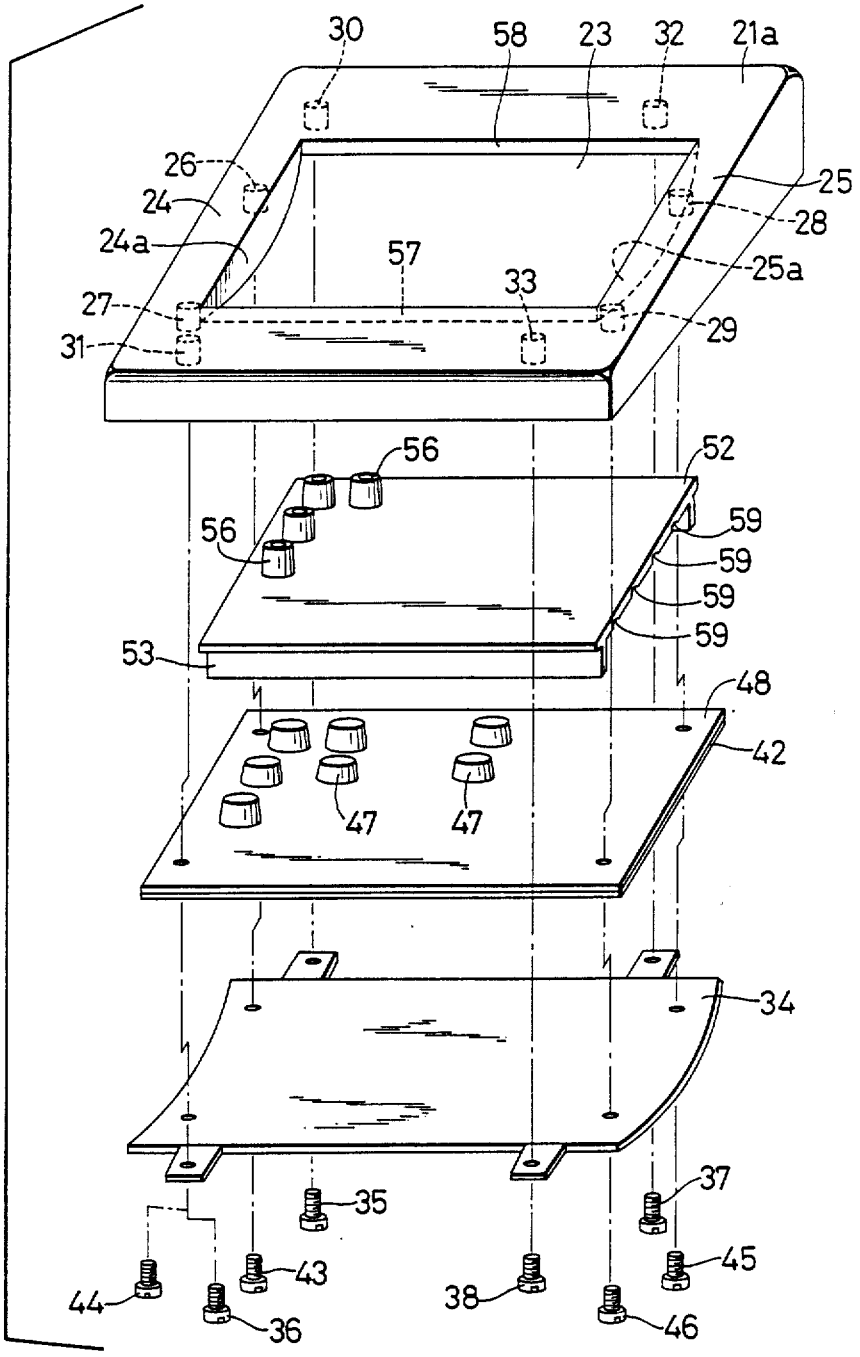
FIG. 4 is an exploded perspective view of the keyboard of FIG. 3.

Referring to FIGS. 3–7, there is illustrated one preferred form of a keyboard constructed according to the invention, wherein a keyboard housing generally indicated at 20 in FIG. 3 includes an upper casing 21 and a lower casing 22, both made of synthetic resin. As illustrated in FIG. 4, the upper casing 21 includes a generally planar portion 21a which has a rectangular opening 23 formed through the thickness of the generally planar portion 21a. The planar portion 21a has a pair of side walls 24 and 25 which define opposite right and left sides of the rectangular aperture 23. Each of the side walls 24, 25 has a downward extension 24a, 25a from the lower surface of the planar portion 21a. The downward extension 24a, 25a has a convex profile at its lower end. The planar portion 21a is further provided with plural downward bosses 26, 27, 28, 29, 30, 31, 32 and 33 which protrude downwardly from the lower surface of the planar portion 21a.

To the downward bosses 30, 31, 32 and 33, there is fixed a curved retainer plate 34 with fixing screws 35, 36, 37 and 38, respectively. This retainer plate 34 is formed with a predetermined curvature in cross section taken along a line parallel to the right and left sides of the rectangular aperture 24, 25. The curved retainer plate 34 is supported at its lower surface by three upward extensions in the form of longitudinal ribs 39, 40 and 41 which extend from an inner surface of the lower casing 24 such that upper ends of the ribs 39–41 abut on the lower surface of the curved retainer plate 34. The longitudinal ribs 39–41 run in a direction perpendicular to the right and left sides of the rectangular aperture 23, and are spaced from each other in a direction parallel to these sides.

A printed circuit board 42 rests on an upper surface of the curved retainer plate 34. The printed circuit board 42 and the retainer plate 34 are fastened to the lower ends of the downward bosses 26, 27, 28 and 29 of the upper casing 21 with fixing screws 43, 44, 45 and 46, respectively, such that the printed circuit board 42 backed by the retainer plate 34 is also curved following the shape of the retainer plate 34. The circuit board 42 comprises a substrate which carries on its upper surface a printed pattern of conductors, i.e., multiple pairs of stationary electrodes 50 as shown in FIG. 5. The substrate (42) further carries, also on its upper surface, an elastomeric member 48 which is formed with multiple frusto-conical or inverted-cup-shaped elastic housings 47 made of rubber, each of which cooperates with the substrate to enclose the corresponding pair of stationary electrodes 50, 50. Each frusto-conical housing 47 has a top wall 47a which is spaced from and opposite to the stationary electrodes 50. A sponge member 49 is bonded at one surface thereof to an inner surface of the top wall 47a of the frusto-conical housing 47. The sponge member 49 carries on the other surface thereof a movable electrode 51 made of flexible aluminum foil which is covered with a thin insulating film 51a made of flexible synthetic resin, such that the movable electrode 51 faces the stationary electrodes 50 via the insulating film 51a. This movable electrode 51 cooperates with the pair of stationary electrodes 50, 50 to constitute a variable capacitor.

Figure 6:
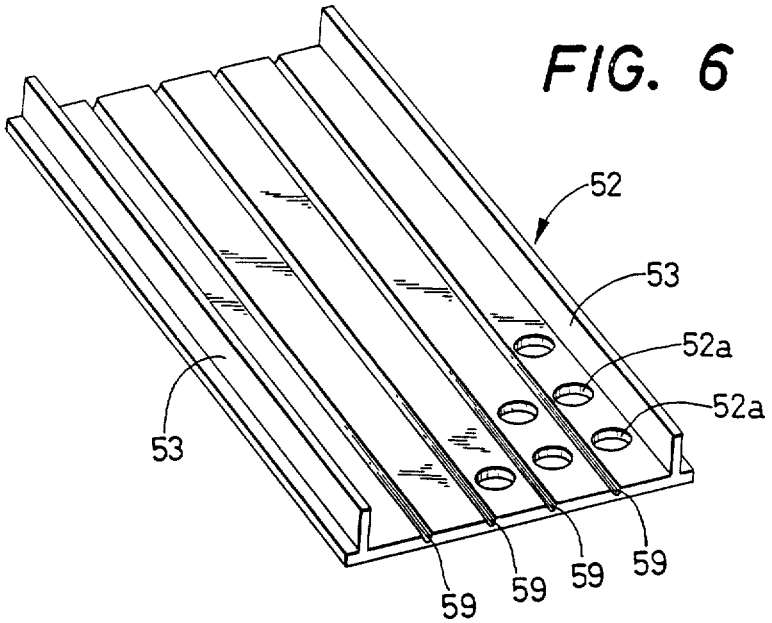
FIG. 6 is a perspective view showing a bottom side of a key holder plate for supporting keys.

A key holder plate 52 made from synthetic resin, is supported on the curved retainer plate 34. The key holder plate 52 has front and rear legs 53 which run parallel to opposite front and rear sides 57 and 58 of the rectangular aperture 23. These legs 53 protrude downwardly from a lower surface of the key holder plate 52 toward the curved retainer plate 34, such that the plate 52 encloses the printed circuit board 42 and the elastic housings 47. At the same time, the key holder plate 52 closes the rectangular aperture 23 formed in the upper casing 21. Thus, the key holder plate 52 has dimensions sufficient to cover or close the rectangular aperture 23. As indicated in FIGS. 5 and 6, a multiplicity of holes 52a are formed in the key holder plate 52 in plural rows parallel to the front and rear legs 53, or perpendicular to the right and left sides of the rectangular aperture 23. Along the peripheral edge of each of these holes 52a, is integrally formed an annular guide portion [52] *56* which [are] *is* concentric with the [holes] *hole* 52a and extends perpendicular from an upper surface of the plate 52 towards the rectangular aperture 23, to support a key which consists of a keystem 55 and a keytop 54 fixed to *the* upper end of the keystem 55. The keystem 55 is inserted through the hole 52a and the annular guide portion 56, such that the key (keystem 55) is slidably movable in a direction perpendicular to the plane of the key holder plate 52. Thus, a multiplicity of keys (54, 55) are supported in plural rows parallel to the front and rear legs 53, i.e., perpendicular to the right and left sides of the rectangular aperture 23 defined by the side walls 24, 25.

The key holder plate 52 has, in its lower surface, four parallel grooves 59 of generally U-shaped cross section which are formed parallel to the front and rear legs 53 and between the adjacent rows of the holes 52a. These parallel grooves 59 are provided to facilitate elastic deformation of the key holder plate 52 in pressed contact with the convex lower ends of the downward extensions 24a, 25a of the side walls 24 and 25, which cooperate with the curved retainer plate 34 to provide the key holder plate 52 with a suitable curved configuration. As shown in FIGS. 3 and 5, the frusto-conical housing 47 of the elastomeric member 48 biases the keystem 55 toward its upper position in which a lower end 55a of the keystem 55 is held in abutting contact with an outer surface of the top wall 47a of the housing 47 and forced against the lower surface of the key holder plate 52, as illustrated in FIG. 5. In this condition wherein the movable electrode 51 is spaced from the stationary electrodes 50 on the printed circuit board 42, a capacitive switch constituted by the keystem 55, keytop 54, movable electrode 51, stationary electrodes 50, etc. is placed in its non-operated position.

As indicated above, the key holder plate 52 is installed such that the right and left ends of the upper surface thereof are held in pressed contact with the convex lower end profiles of the downward extensions 24a, 25a of the side walls 24, 25 of the upper casing 21, respectively, with the front and rear legs 53 supported on the curved retainer plate 34 which is screwed to the upper casing 21. With this arrangement, the key holder plate 52 is subject to elastic deformation to a curvature corresponding to the convex profile of the downward extensions 24a, 25a, whereby an operating surface 60 of the keyboard defined by the top faces of the individual keytops 54 is curved to a desired downwardly convex shape corresponding to the curvature of the key holder plate 52, in cross section taken along a line parallel to the right and left sides of the rectangular aperture 23, i.e., perpendicular to the rows of the keys (54, 55). It is noted, in this connection, that the retainer plate 34 has a curvature equal to the curvature of the convex profile of the downward extensions 24a, 25a. Stated the other way, the retainer plate 34 is curved such that a distance thereof to the lower end of the downward extensions 24a, 25a is constant over an entire width thereof along the right and left sides of the rectangular aperture 23.

Each of the capacitive switches constructed as described above, is operated in the following manner.

Figure 7:
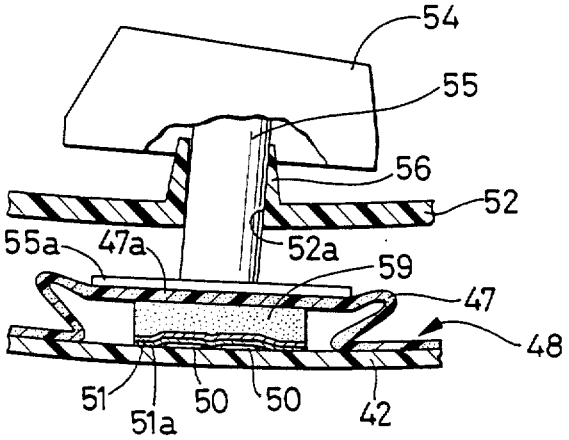
FIG. 7 is an enlarged cross sectional view, showing the capacitive switch of FIG. 5 in its closed or operated position upon depression of the key.

Upon depression of the keytop 54 while it is located at its upper position, the keystem 55 is moved downward while being guided by the annular guide portion 56, whereby the top wall 47a of the frusto-conical housing 47 is forced down by an integral lower end 55a of the keystem 55. As a result, the assembly of the sponge member 49 and the movable electrode 51, fixed to the inner surface of the top wall 47a of the housing 47, is moved toward the printed circuit board 42, and the movable electrode 51 covered by the insulating film 51a is brought into contact with the pair of stationary electrodes 50, 50, as shown in FIG. 7. Thus, the two stationary electrodes 50 are capacitively coupled to each other, and a high frequency signal is transferred from one of the electrodes 50 to the other. Since the movable electrode 51 is carried by the elastic sponge member 49 bonded to the top wall 47a of the elastic housing 47, the movable electrode 51 covered by the insulating film 51a may be held in close and perfect contact with the other surfaces of the stationary electrodes 50, through elastic deformation of the sponge member 49, thereby assuring a stable transfer of the high frequency signal of sufficiently high level between the two stationary electrodes 50.

When the operator's finger pressure is released from the keytop 54, the resilient force of the elastic housing 47 causes the keystem 55 and the movable electrode assembly 49, 51, 51a to be moved upward to their original upper position, whereby the movable electrode 51 is separated from the stationary electrodes 50, and the signal transfer between the two stationary electrodes 50 is ceased.

The keyboard of the present embodiment comprising the components which have been discussed above, is assembled in the following way.

In assembling the keyboard, the printed circuit board 42 is first placed on the curved retainer plate 34. Then, the elastomeric member 48 with the integrally formed elastic housings 47 is set on the printed circuit board 42. In the meantime, the keystems 55 with the lower ends 55a are set in the key holder plate 52 such that the keystems 55 are slidably movable through the holes 52a and annular guide portions 56. The keytops 54 are then secured to the keystems 56. The key holder plate 52 is placed on the curved retainer plate 34 such that the printed circuit board 42 and the elastomeric member 48 are enclosed by the two plates 34 and 52. Subsequently, an assembly of these components 34, 42, 48 and 52 superposed one on another is secured to the upper casing 21 with the fixing screws 43, 44, 45 and 46 threaded to the respective downward bosses 26, 27, 28 and 29, such that the right and left ends of the key holder plate 52 are kept in pressed contact with the lower ends of the downward extensions 24a, 25a of the side walls 24, 25, and such that the keytops 54 project out of the rectangular aperture 23.

Successively, the curved retainer plate 34 is further fastened to the upper casing 21 with the fixing screws 35, 36, 37 and 38 threaded to the respective downward bosses 30, 31, 32 and 33, in order to assure that the key holder plate 52 is held curved, due to elastic deformation thereof, exactly to the convex lower end profiles of the downward extensions 24a, 25a. When the assembly 34, 42, 48 and 52 is secured to the upper casing 21 with the screws 43–46 and 35–38, the key holder plate 52 is comparatively easily curved with the aid of the grooves 59 formed therein, and the curved retainer plate 34 serves to hold the printed circuit board 42 and the elastomeric member 48 as well as the key holder [plte] *plate* 52, in their curved postures. With the key holder plate 52 retained in its curved posture as described above, the multiple keys of the same dimension are supported by the plate 52 so that the top faces of the keytops 54 define an operating surface [with] *which* is downwardly convexed to a curvature substantially identical to that rendered to the key holder plate 52.

Finally, the lower casing 22 is coupled to the upper casing 21 to form the keyboard housing 20.

As described above in detail, the key holder plate 52 has the annular guide portions 56 formed integrally therewith on its upper surface, and the plural U-shaped parallel grooves 59 in its lower surface. The integral formation of the guide portions 56 eliminates otherwise required cost and labor for fixing separate guide portions to a pre-shaped holder plate as used in the known keyboard. The provision of the grooves 59 contributes to easier shaping of the key holder plate 52 to the convex profile of the downward extensions 24a, 25a of the side walls 24, 25, so that the keys 54, 55 may be disposed with the top faces of the keytops 54 located substantially on a surface which is downwardly curved to a convex shape corresponding to the curvature of the key holder plate 52, without varying the dimensions and/or shapes of the keys according to the rows in which they are disposed. Thus, the keyboard constructed according to the invention is simple in construction, economical to manufacture and easy to operate.

Further, the use of the sponge member 49 to support the movable electrode 51 on the inner surface of the top wall 47a of the elastic housing 47, undergoes elastic deformation upon depression of the keytop 54, which permits perfect contact of the movable electrode 51 with the stationary electrodes 50 over the entire areas of their opposite surfaces, even under condition that the printed circuit board 42 is curved. Consequently, the capacitive switch including the stationary and movable electrodes 50, 51, and the keytop and keystem 54, 55, may be operated with increased switching reliability.

While the described embodiment represents the preferred form of a keyboard of the present invention, it is to be understood that modifications and variations are possible in the light of the foregoing teachings, and without departing from the scope of the invention defined in the appended claims.

What is claimed is:

1. A keyboard having multiple key-switches each comprising a key having a finger-pressed top face, a movable electrode and at least two stationary electrodes, comprising:

an upper casing including a portion which has a rectangular aperture formed through a thickness of said portion, and a pair of side walls defining opposite right and left sides of said rectangular aperture, said side walls each having a downward extension from one surface of said portion, said downward extension having a convex profile at its lower end;

a key holder plate supporting the multiple keys in plural rows perpendicular to said right and left sides and movably in a direction perpendicular to a plane of the key holder plate, said key holder plate having holes through which said keys extend in said direction, and further having integral guide portions formed concentrically with said holes and extending in said direction towards said rectangular aperture;

retaining means for holding said key holder plate curved in cross section across said plural rows, with elastic deformation thereof in pressed contact with said convex profile of said downward extension, whereby a surface generally defined by the top faces of said multiple keys is curved to said convex profile in said cross section;

a printed circuit board disposed below said key holder plate and having a pattern of said stationary electrodes such that said key-switches are operated upon movement of said multiple keys; and a lower casing disposed below said printed circuit board and cooperating with said upper casing to enclose said key holder plate, said retaining means and said printed circuit board.

2. A keyboard as set forth in claim 1, wherein said key holder plate has a plurality of grooves formed parallel to said plural rows over an entire length thereof, to facilitate said elastic deformation following said convex profile.

3. A keyboard as set forth in claim 1, wherein each of said multiple keys includes a keystem extending through corresponding one of said holes, and a keytop fixed to an upper end of said keystem and having said top face, each of said integral guide portions comprising an annular portion formed along a peripheral edge of said corresponding one of said holes and extending towards said keytop to guide said keystem.

4. A keyboard as set forth in claim 1, wherein said key holder plate is made of synthetic resin.

5. A keyboard as set forth in claim 4, wherein said key holder plate has a plurality of grooves formed parallel to said plural rows over an entire length thereof, to facilitate said elastic deformation following said convex profile.

6. A keyboard as set forth in claim 1, wherein said retaining means includes plural fixing screws for fastening said key holder plate to said upper casing.

7. A keyboard as set forth in claim 6, wherein said upper casing has plural bosses downwardly protruding from said one surface of said portion, said key holder plate being fastened to lower ends of said plural bosses with said fixing screws.

8. A keyboard as set forth in claim 1, wherein said retaining means comprises a curved retainer plate which is disposed below said printed circuit board to back the circuit board, said curved retainer plate being curved such that a distance thereof to said lower end of said downward extension is constant over an entire width thereof along said right and left sides.

9. A keyboard as set forth in claim 8, wherein said key holder plate has plural legs protruding downwardly towards said curved retainer plate, and is supported at said plural legs by said curved retainer portions.

10. A keyboard as set forth in claim 8, wherein said curved retainer plate is fixed to said upper casing.

11. A keyboard as set forth in claim 8, wherein said curved retainer plate is made from a metal sheet.

12. A keyboard as set forth in claim 8, wherein said lower casing has at least one upward extension from an inner surface thereof, said upward extension abutting on a lower surface of said curved retainer plate to support the curved retainer plate.

13. A keyboard as set forth in claim 12, wherein said at least one upward extension is a plurality of longitudinal ribs running along said plural rows and spaced from each other in a direction parallel to said right and left sides, said longitudinal ribs having different heights from said one surface of the lower casing.

14. A keyboard as set forth in claim 1, wherein said printed circuit board comprises a substrate carrying multiple pairs of stationary electrodes corresponding to said multiple keys, and further carrying multiple frustoconical elastic housings cooperating with said substrate to enclose said multiple pairs of stationary electrodes, respectively, each of said elastic housings having a top wall spaced from and opposite to the corresponding pair of stationary electrodes, said top wall carrying on its inner surface said movable electrode, said each elastic housing normally holding, with its elastic biasing force, the corresponding key and movable electrode in upper positions thereof, and being elastically deformed, upon depression of said corresponding key, thereby moving said movable electrode into contact with said corresponding pair of stationary electrodes via an insulating film, whereby the pair of stationary electrodes are electrically coupled to each other.

15. A keyboard as set forth in claim 1, wherein said keys disposed in one of said plural rows have the same dimensions and shape as the keys disposed in another of said plural rows.

16. A keyboard as set forth in claim 1, wherein said key-switches are capacitive switches.

17. A keyboard as set fortth in claim 16, wherein each of said key-switches comprises two stationary electrodes provided on said printed circuit board.

18. A keyboard as set forth in claim 17, wherein said printed circuit board comprises a substrate carrying multiple pairs of said stationary electrodes corresponding to said multiple keys, and further carrying multiple frusto-conical elastic housings cooperating with said substrate to enclose said multiple pairs of stationary electrodes, respectively, each of said elastic housings having a top wall spaced from and opposite to the corresponding pair of stationary electrodes, said top wall carrying on its inner surface said movable electrode, said each elastic housing normally holding, with its elastic biasing force, the corresponding key and movable electrode in upper positions thereof, and being elastically deformed, upon depression of said corresponding key, thereby moving said movable electrode into contact with said corresponding pair of stationary electrodes via an insulating film, whereby the pair of stationary electrodes are electrically coupled to each other.

*19. A keyboard having multiple key-switches each comprising a key having a finger-pressed top face movable electrode means and at least one stationary electrode, comprising:*

*an upper casing including a portion which has a rectangular aperture formed through a thickness of said portion, and a pair of side walls defining opposite right and left sides of said rectangular aperture, said side walls each having a downward extension from one surface of said portion, said downward extension having a convex profile at its lower end;*

*a key holder plate supporting the multiple keys in plural rows perpendicular to said right and left sides and movably in a direction perpendicular to a plane of the key holder plate, said key holder plate having holes through which said keys extend in said direction, and further having integral guide portions formed concentrically with said holes and extending in said direction towards said retangular aperture;*

*retaining means for holding said key holder plate curved in cross section across said plural rows, with elastic deformation thereof in pressed contact with said convex profile of said downward extension, whereby a surface generally defined by the top faces of said multiple keys is curved to said convex profile in said cross section;*

*a printed circuit board disposed below said key holder plate and having a pattern of said stationary electrode means such that said key-switches are operated upon movement of said multiple keys; and*

*a lower casing disposed below said printed circuit board and cooperating with said upper casing to enclose said key holder plate, said retaining means and said printed circuit board.*

*20. A keyboard having multiple key-switches each comprising a key having a finger-pressed top face comprising:*

*a key holder plate of generally planar flat shape supporting the multiple keys in plural rows movably in a direction perpendicular to a plane of the key holder plate, said key holder plate having holes through which said keys extend and integral guide portions formed concentrically with said holes and extending in said direction;*

*retaining means for retaining said key holder plate, said retaining means having a curvature; and*

*holding means for holding said key holder plate elastically deformed and downwardly convexed following said curvature, in cross section across said plural rows of keys, whereby a surface generally defined by the top faces of said multiple keys is downwardly convexed in said cross section.*

*21. A keyboard as set forth in claim 20, wherein said key holder plate further comprises at least one deformation-facilitating portion located between adjacent rows of said plural rows of keys.*

*22. A keyboard as set forth in claim 21, wherein said at least one deformation-facilitating portion comprises at least one groove parallel to and located between said adjacent rows of keys.*

*23. A keyboard as set forth in claim 22, wherein each said at least one groove is disposed on a lower surface of said key holder plate.*

*24. A keyboard having multiple key-switches each comprising a key having a finger-pressed top face, movable electrode means and at least one stationary electrode, comprising:*

*an upper casing including a portion which has a rectangular aperture formed through a thickness of said portion;*

*a key holder plate supporting the multiple keys in plural rows perpendicular to right and left sides of a said aperture and movably in a direction perpendicular to a plane of the key holder plate, said key holder plate having holes through which said keys extend in said direction and further having integral guide portions formed concentrically with said holes and extending in said direction toward said rectangular aperture;*

*curving means for holding said key holder plate downwardly convexedly curved in cross section across said plural rows, with elastic deformation thereof, said curving means having a curvature, whereby a surface generally defined by the top faces of said multiple keys is curved substantially following said curvature;*

*a printed circuit board disposed below said key holder plate and having a pattern of said stationary electrode means such that each said key-switch is operated upon movement of its corresponding key; and*

*a lower casing disposed below said printed circuit board and cooperating with said upper casing to enclose said key holder plate, said curving means and said printed circuit board.*

*25. A keyboard comprising:*

*a plurality of key-switches each including a key having a finger-pressed top face and means for transferring an electrical signal upon depression of said top face;*

*a key holder plate of generally planar flat shape supporting the multiple keys in plural rows movably in a direction perpendicular to a plane of the key holder plate, said key holder plate having holes through which said keys extend and integral guide portions formed concentrically with said holes and extending in said direction;*

*retaining means for retaining said key holder plate, said retaining means having a curvature; and*

*holding means for holding said key holder plate elastically deformed and downwardly convexed following said curvature, in cross section across said plural rows of keys, whereby a surface generally defined by the top faces of said multiple keys is downwardly convexed in said cross section.*

*26. A keyboard comprising:*

*a plurality of key-switches each including a key having a finger-pressed top face, movable electrode means and stationary electrode means;*

*an upper casing including a portion which has a rectangular aperture formed through a thickness of said portion;*

*a key holder plate supporting the multiple keys in plural rows perpendicular to right and left sides of a said aperture and movably in a direction perpendicular to a plane of the key holder plate, said key holder plate having holes through which said keys extend in said direction and further having integral guide portions formed concentrically with said holes and extending in said direction toward said rectangular aperture;*

*curving means for holding said key holder plate downwardly convexedly curved in cross section across said plural rows, with elastic deformation thereof, said curving means having a curvature, whereby a surface generally defined by the top faces of said multiple keys is curved substantially following said curvature;*

*a printed circuit board disposed below said key holder plate and having a pattern of said stationary electrode means such that each said key-switch is operated upon movement of its corresponding key; and*

*a lower casing disposed below said printed circuit board and cooperating with said upper casing to enclose said key holder plate, said curving means and said printed circuit board.*

*27. A keyboard as set forth in claim 26, wherein said stationary electrode means comprises at least two stationary electrodes.*

* * * * *